(12) United States Patent
Betran Palomas

(10) Patent No.: US 9,759,191 B2
(45) Date of Patent: Sep. 12, 2017

(54) WIND TURBINE BLADE

(71) Applicant: ALSTOM RENEWABLE TECHNOLOGIES, Grenoble (FR)

(72) Inventor: Jaume Betran Palomas, Sant Cugat Del Valles (ES)

(73) Assignee: ALSTOM Renewable Technologies, Grenoble (FR)

( * ) Notice: Subject to any disclaimer, the term of this patent is extended or adjusted under 35 U.S.C. 154(b) by 248 days.

(21) Appl. No.: 14/762,031

(22) PCT Filed: Jan. 20, 2014

(86) PCT No.: PCT/EP2014/051061
§ 371 (c)(1),
(2) Date: Jul. 20, 2015

(87) PCT Pub. No.: WO2014/111585
PCT Pub. Date: Jul. 24, 2014

(65) Prior Publication Data
US 2015/0354536 A1    Dec. 10, 2015

Related U.S. Application Data

(60) Provisional application No. 61/804,074, filed on Mar. 21, 2013.

(30) Foreign Application Priority Data

Jan. 21, 2013  (EP) .................................... 13382022

(51) Int. Cl.
*F03D 7/02* (2006.01)
*F03D 1/06* (2006.01)
*F03D 7/04* (2006.01)

(52) U.S. Cl.
CPC ......... *F03D 7/0236* (2013.01); *F03D 1/0675* (2013.01); *F03D 1/0683* (2013.01);
(Continued)

(58) Field of Classification Search
CPC ............ F05B 2240/31; F05B 2240/311; F03D 7/0232; F03D 7/0236; F03D 7/022;
(Continued)

(56) References Cited

U.S. PATENT DOCUMENTS 5,224,826 A * 7/1993 Hall .......................... B64C 3/44
  310/323.17
6,375,127 B1    4/2002 Appa
(Continued)

FOREIGN PATENT DOCUMENTS

WO    WO 2004088130    10/2004

OTHER PUBLICATIONS

International Search Report and Written Opinion for PCT/EP2014/05106, mailed Mar. 27, 2014, 10 pgs.

*Primary Examiner* — Mark Laurenzi
*Assistant Examiner* — Xiaoting Hu
(74) *Attorney, Agent, or Firm* — Dority & Manning, P.A.

(57) ABSTRACT

Wind turbine blade comprising at least one deformable trailing edge section having a plurality of actuators consecutively arranged substantially downstream from one another and a control system for controlling the actuators, wherein a downstream end of one actuator is connected by a substantially rigid link with an upstream end of the next actuator and the plurality of actuators comprises an upper actuator being mounted above a chord line of the blade section and a lower actuator being mounted below a chord line of the blade section. Wind turbines comprising such a blade and methods of controlling loads on a wind turbine blade are also described.

20 Claims, 6 Drawing Sheets

(52) U.S. Cl.
CPC ........... *F03D 7/022* (2013.01); *F03D 7/0232* (2013.01); *F03D 7/0252* (2013.01); *F03D 7/041* (2013.01); *F03D 7/042* (2013.01); *F05B 2240/31* (2013.01); *F05B 2240/311* (2013.01); *F05B 2260/407* (2013.01); *Y02E 10/721* (2013.01); *Y02E 10/723* (2013.01)

(58) Field of Classification Search
CPC .... F03D 7/0252; F03D 1/0641; F03D 1/0683; B64C 3/44; B64C 3/48; B64C 3/50; B64C 2003/445; B64C 2027/7261; B64C 2027/7266; B64C 2027/7272; B64C 2027/7277; B64C 2027/7283; B64C 2027/7288; B64C 2027/7294
See application file for complete search history.

(56) References Cited

U.S. PATENT DOCUMENTS

| | | | |
|---|---|---|---|
| 2001/0052287 A1 | 12/2001 | Perez et al. | |
| 2002/0100842 A1 | 8/2002 | Perez | |
| 2007/0036653 A1* | 2/2007 | Bak | F03D 1/0641 416/98 |
| 2009/0097976 A1* | 4/2009 | Driver | F03D 7/022 416/42 |
| 2009/0290982 A1* | 11/2009 | Madsen | F03D 1/0633 416/61 |
| 2010/0127504 A1* | 5/2010 | Hancock | F03D 1/0641 290/55 |
| 2010/0247314 A1 | 9/2010 | Narasimalu | |
| 2010/0259046 A1* | 10/2010 | Kota | F03D 1/0641 290/44 |
| 2011/0084174 A1* | 4/2011 | Hemmelgarn | B64C 3/48 244/200 |
| 2011/0116927 A1* | 5/2011 | Hancock | F03D 1/0675 416/23 |
| 2012/0169060 A1* | 7/2012 | Loh | F03D 1/0641 290/55 |
| 2012/0269632 A1* | 10/2012 | Westergaard | F03D 1/0641 416/159 |
| 2013/0224024 A1* | 8/2013 | Chang | F03D 1/0633 416/147 |
| 2015/0192106 A1* | 7/2015 | Betran Palomas | F03D 7/022 416/1 |
| 2016/0159455 A1* | 6/2016 | Haslach | B64C 3/48 244/219 |

* cited by examiner

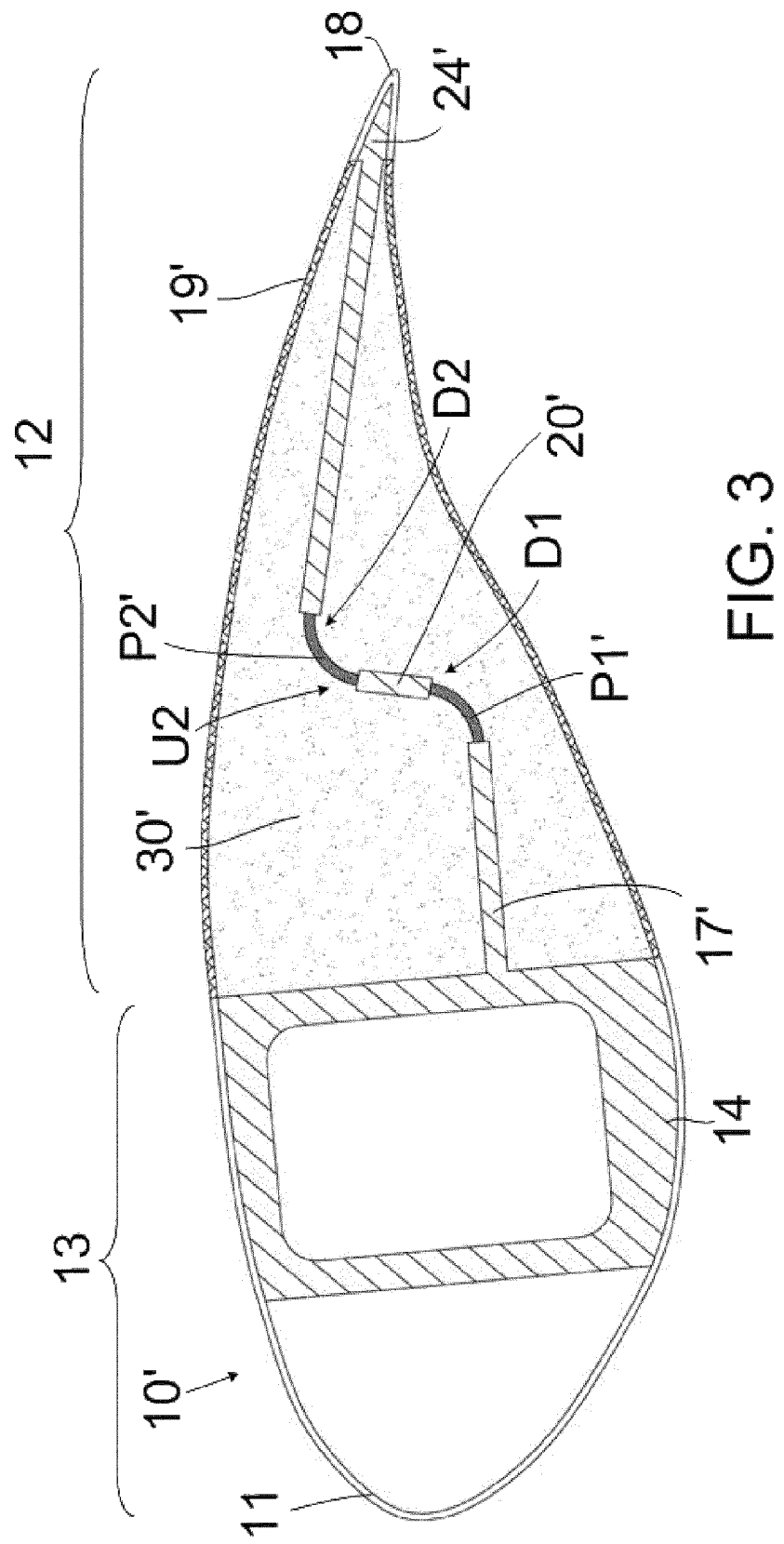

WIND TURBINE BLADE

This application claims the benefit of European Patent Application 13382022.5 filed on Jan. 21, 2013 and U.S. Provisional Patent Application Ser. No. 61/804,074 filed on Mar. 21, 2013.

The present application relates to wind turbine blades comprising at least one deformable trailing edge section and wind turbines comprising such blades. It further relates to methods of controlling loads on such wind turbine blades.

BACKGROUND ART

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox. The gearbox (if present), the generator and other systems are usually mounted in a nacelle on top of a wind turbine tower.

Pitch systems are normally employed for adapting the position of the blades to varying wind conditions. In this respect, it is known to rotate the position of each blade along its longitudinal axis in such a way that lift and drag are changed to reduce torque. This way, even though the wind speed increases, the torque transmitted by the rotor to the generator remains substantially the same. Using pitch systems may be particularly suitable for adapting the wind turbine blade to a varying wind speed. However, the control of the pitch systems may be rather slow and may not be suitable to react to a sudden wind gust or any other high rate changing wind conditions.

Some systems change the aerodynamics of a wind turbine blade by providing the blade with a trailing edge flap hinged to a main body. However, deflecting the aerodynamic surface about a hinged point may lead to flow separation which may cause abrupt aerodynamic changes thus decreasing load alleviation and reducing efficiency of the wind turbine.

Document WO2004/088130 describes the control of aerodynamic forces substantially instantaneously and locally along the blades of a wind turbine rotor by continuous variation of the airfoil geometry in the leading edge region and trailing edge region along part or the whole blade span. It further describes the use of smart materials or mechanical actuators integrated in a deformable material changing the outer geometry in the leading and trailing edge region and thereby changing the blade section aerodynamic forces.

SUMMARY

It is an object of the present disclosure to provide an improved blade allowing variation of airfoil geometry.

In a first aspect a wind turbine blade is provided. The blade comprises at least one deformable trailing edge section having a plurality of actuators consecutively arranged substantially downstream from one another and a control system for controlling the actuators, wherein a downstream end of one actuator is connected by a substantially rigid link with an upstream end of the next actuator; and the plurality of actuators comprises an upper actuator being mounted above a chord line of the blade section and a lower actuator being mounted below a chord line of the blade section.

According to this aspect, at least one upper actuator and at least one lower actuator are provided inside the trailing edge section. This ensures at least two degrees of freedom to the control system. Furthermore, the fact that two consecutive actuators are connected to each other by a rigid link ensures a leverage effect between them. The actuators may thus reinforce each other, or at least partially cancel one another's effects. The blade's trailing edge shape may thus be widely changed upon activation of the actuators. This modifies the aerodynamic surface of the blade so that it can be used to e.g. mitigate the loads acting on the blades. All this may be achieved without excessively complicating a wind turbine blade structure.

In some embodiments, at least one upper actuator may be mounted close to an inner surface of a suction side of a skin of the blade trailing edge section and at least one lower actuator may be mounted close to an inner surface of a pressure side of a skin of the blade trailing edge section. Mounting the actuators close to opposite inner surfaces of the blade' skin improves the shape of the deflected trailing edge and the leverage action between consecutive actuators can be increased. In some of these cases, the at least one upper actuator may be mounted directly to the inner surface of the suction side of the blade skin and the at least one lower actuator may be mounted directly to the inner surface of the pressure side of the blade skin.

In some embodiments, the rigid links connected to the upstream end of the actuators may be mounted substantially perpendicular to the blade skin. This way, the aerodynamic profile may be changed in a very smooth manner, e.g. reducing or avoiding local bulging of a profile.

Another aspect provides a wind turbine comprising at least one blade substantially as hereinbefore described.

A further aspect provides a method of controlling a wind turbine blade substantially as hereinbefore described, the method comprising activating at least one upper and/or at least one lower actuator such that a structural shape of the blade trailing edge changes in at least two degrees of freedom, e.g. flap angle and chord length.

Additional objects, advantages and features of embodiments of the present invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which:

FIG. 3 shows a cross-sectional view of a wind turbine blade according to yet another embodiment.

DETAILED DESCRIPTION OF EMBODIMENTS

Figure 1:
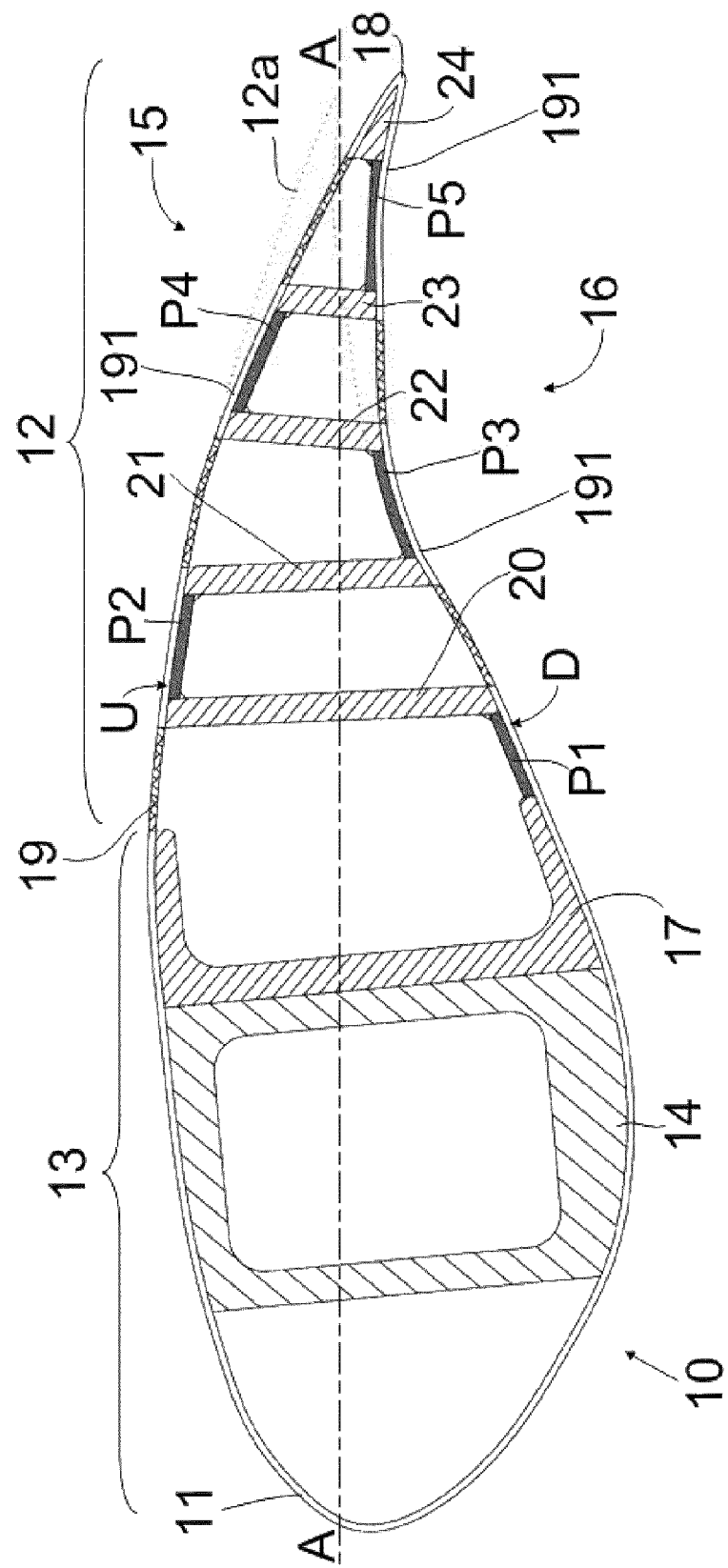
FIG. 1 shows a cross-sectional view of a wind turbine blade according to an embodiment.

FIG. 1 shows a cross-sectional view of a wind turbine blade 10 having a skin 11. The blade section may comprise a deformable trailing edge portion 12 and a substantially non-deformable portion 13. FIG. 1 shows two states of the blade section: an initial shape indicated by dotted lines 12a where the trailing edge is non-deformed and a deformed shape indicated by solid lines where the trailing edge portion 12 is deformed.

The deformable trailing edge may extend on the total length of the blade or it may extend on at least one section of the blade, e.g. on substantially one third of the total length, in particular the portion closest to the tip of the blade.

In other cases, a plurality of deformable trailing edge sections may also be provided.

A spar box 14 may be arranged inside the substantially non-deformable portion 13 of the blade in order to maintain the distance between an inner surface of a suction side 15 of the blade and an inner surface of a pressure side 16 of the blade. The spar box 14 may support wind loads acting on the blades, and in particular the blade bending loads. A rigid structure 17 may further be arranged inside the substantially non-deformable portion 13 of the blade. Such a structure 17 may support at least in part the loads derived from the deformable trailing edge 12 and may have a substantially C-shaped cross-section, the upper and lower parts of the C supporting the blade skin.

The embodiment shown in FIG. 1 may comprise five piezoelectric actuators P1-P5 arranged inside the trailing edge portion 12. Actuators P1, P3 and P5 may be mounted below a chord line A-A of the blade cross-section thus being lower actuators and actuators P2 and P4 may be mounted above the chord line A-A of the blade thus being upper actuators. According to this embodiment, the lower actuators may be mounted substantially tangential to an inner surface of a pressure side 16 of the blade skin and the upper actuators may be mounted substantially tangential to an inner surface of a suction side 15 of the blade skin.

Rigid links 20-23 may further be provided for connecting each actuator to the next consecutive actuator. It should be understood that the rigid links may be structural elements, e.g. beams, having a sufficient stiffness such as not to deform, in particular under the influence of the actuators.

In FIG. 1, rigid link 20 may connect a downstream end (arrow D) of actuator P1 with an upstream end (arrow U) of actuator P2, rigid link 21 may connect a downstream end of actuator P2 with an upstream end of actuator P3, rigid link 22 may connect a downstream end of actuator P3 with an upstream end of actuator P4 and rigid link 23 may connect a downstream end of actuator P4 with an upstream end of actuator P5. Furthermore, an upstream end of actuator P1 may be connected to the rigid structure 17 provided in the non-deformable portion 13 and a downstream end of actuator P5 may be connected to the blade skin at the trailing edge end 18 by a relatively rigid structure 24.

In addition, skin areas 19 of the trailing edge portion 12 that are not supporting the actuators P1-P5, the rigid links 20-23 or the rigid structure 24 may be made of a relatively flexible material. This ensures deformability and smoothness of the blade surface upon actuation of any actuator. Elastic or elastomeric materials are example of materials conferring the needed flexibility so that cracks due to fatigue loads are reduced. The rest 191 of the blade skin may be made out of any known composite material typically used in wind turbine blades construction in order to maintain blade's high rigidity and resistance to fatigue and wear while not compromising its weight.

In an alternative example, the skin areas supporting the rigid links may be made from the same relatively flexible material (see FIG. 2d), since the rigid links may give sufficient support by themselves.

A control system for controlling the actuators may also be provided. In the example illustrated in FIG. 1 the control system may apply an electrical field on the piezoelectric elements so as to generate a mechanical strain (deformation) on the surface (blade skin) on which the actuators are being mounted. Based on the reverse piezoelectric effect, each actuator converts the input signal received from the control system into an internal mechanical deformation of the piezoelectric element thus deforming the surface of the blade on which it is mounted. The rigid links ensure a combined effect between the actuators. Loads acting on the blade may thus be easily compensated by adapting the shape of the blade.

In the example of FIG. 1, many combinations of piezoelectric activation may be possible: each of the piezoelectric elements may be deformed in an upwards manner, a downwards manner or may be maintained in the default neutral position. Using the plurality of actuators, a very large number of combinations of flap angle and/or chord length of the blade may be available to adjust lift (and drag and pitch moment) to adapt to changing wind loads.

As used herein the chord line is the imaginary straight line defined between the leading and trailing edge when the flap angle is zero. Considering a sign convention in which a minus sign is used for deformation of the trailing edge towards the suction side and a plus sign is used for a deformation of the trailing edge towards the pressure side, the following cases are only some of several possible combinations available for the embodiment of FIG. 1:

Case 1: actuators P1, P3 and P5 may be deformed towards the pressure side and actuators P2 and P4 may be deformed towards the suction side, then the flap angle may be substantially maintained but the chord length may be extended. The lift coefficient may thus be slightly modified with a larger chord length. This may provide higher lift.

Case 2: actuators P1, P3 and P5 may be deformed towards the suction side and actuators P2 and P4 may be deformed towards the pressure side, then the flap angle may be substantially maintained and the chord length may be reduced. The lift coefficient may thus be slightly modified with a shorter chord length. This may provide lower lift.

Case 3: actuators P1, P3, P4 and P5 may be deformed towards the suction side and actuator P2 may be deformed towards the pressure side, the flap angle may thus be reduced while the chord length may be only slightly modified. The lift may be lowered.

Case 4: actuators P1, P3, P4 and P5 may be deformed towards the pressure side and actuator P2 may be deformed towards the suction side, the flap angle may thus be increased while the chord length may be only slightly modified. The lift may be increased.

Case 5: only actuator P1 may be deformed. In this case, the deformable trailing edge may act substantially as a hinged flap.

Case 6: all actuators may be deformed towards the pressure side. In this case, the chord length may remain substantially the same and the lift may be increased.

Clearly, many other options are available.

In general for blades having a positive angle of attack, actuating the trailing edge portion towards its positive position (pressure side) increases the lift. The loads on a blade may thus be increased, but this may be acceptable and/or desirable, in accordance with circumstances (e.g. sudden temporary decrease in wind speed). The increase of the lift increases the aerodynamic torque of the rotor. Furthermore, actuating a trailing edge portion towards its negative position (suction side) decreases the lift. The decrease in lift reduces the aerodynamic torque and the loads on the blade in general. Deforming the trailing edge towards suction side may thus be used to counteract e.g. temporary high loads on a blade (sudden wind gusts).

FIGS. 2a-2d show alternative embodiments. The same reference numbers will be used for matching parts.

Figure 2A:
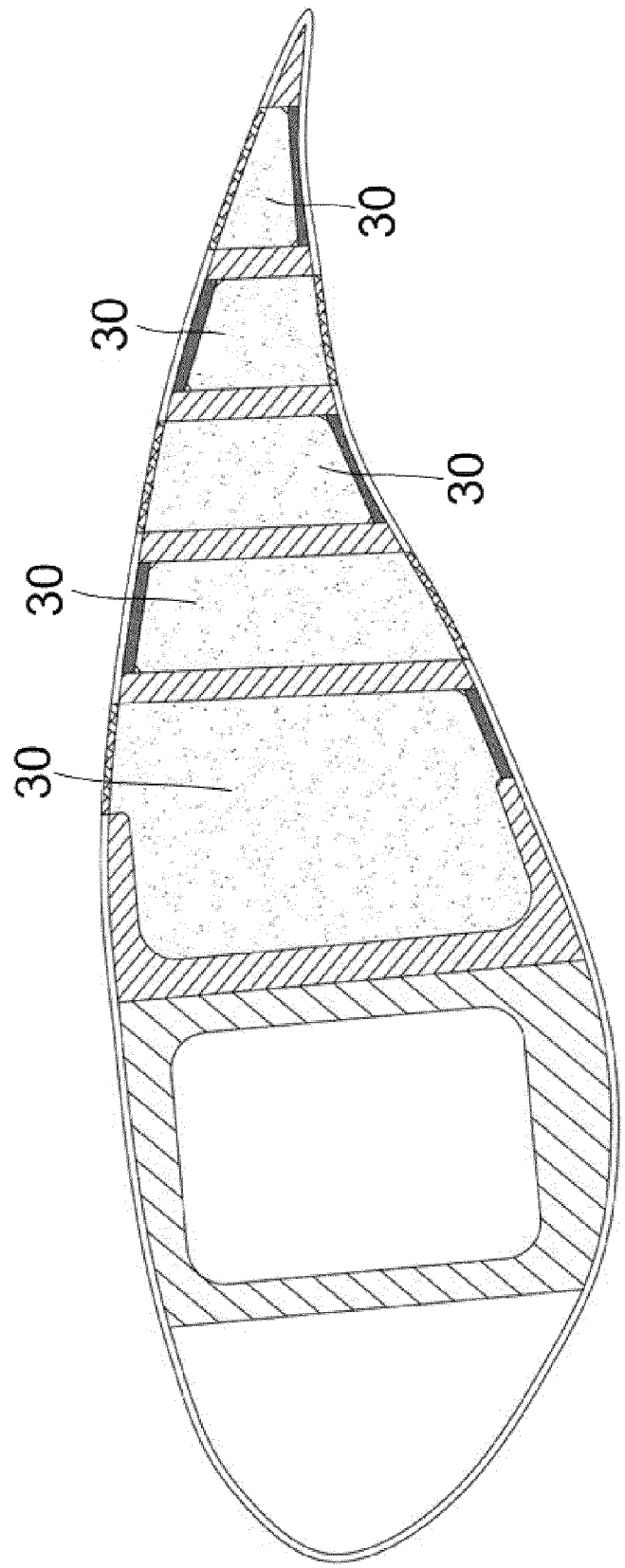
FIGS. 2a-2d show cross-sectional views of wind turbine blades according to other embodiments.

The alternative illustrated in FIG. 2a differs from that of FIG. 1 in that inner areas 30 of the blade trailing edge portion 12 may be filled with a material with a honeycomb structure. This kind of material may be relatively lightweight and display a desirable anisotropic behavior: it may be relatively stiff in a direction substantially perpendicular to the chord line, i.e. it is stiff so as to maintain the airfoil thickness and not deform under aerodynamic pressure. At the same time, it may be more flexible in a direction substantially parallel to the chord line, thus allowing proper movement of the actuators. In other implementations, instead of a honeycomb structure material, other kinds of lightweight materials having such anisotropic properties so as to permit an internal structural behavior may also be used.

Figure 2B:
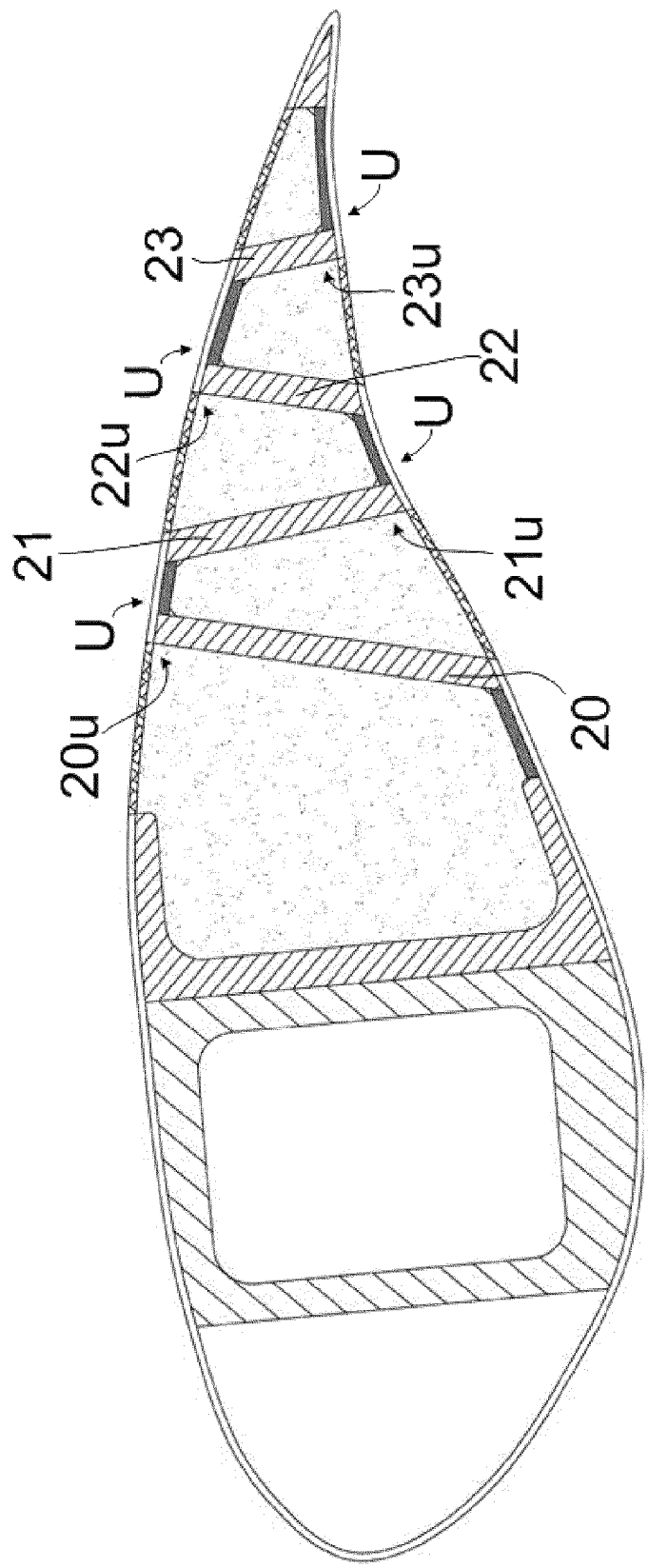

The alternative illustrated in FIG. 2b differs from that of FIG. 2a in that the rigid links 20-23 may be mounted substantially perpendicular to the blade skin at their end 20u, 21u, 22u and 23u connecting upstream ends U of actuators P2-P5. By having the rigid links substantially perpendicular to the skin of the blade, the aerodynamic profile may be deformed in a smoother manner, e.g. local bulging may be avoided or reduced.

Figure 2C:
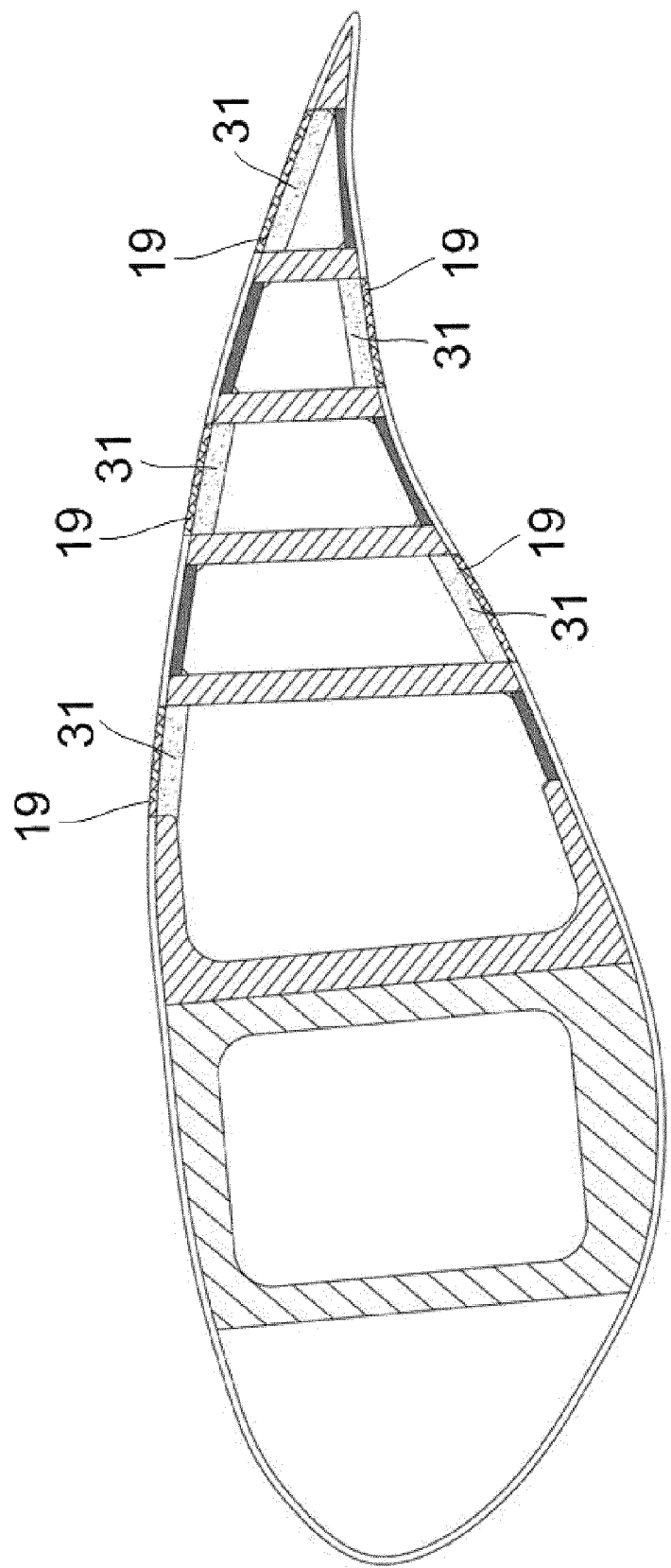

The alternative illustrated in FIG. 2c differs from that of FIG. 1 in that those inner areas 31 of the blade trailing edge portion 12 which are immediately next to the flexible material used for skin areas 19 of the trailing edge portion may comprise a honeycomb structure material (or similar) lying over the flexible material. The skin surface may thus be particularly stiff to withstand aerodynamic loads, but more easily allow deformation of the skin in a direction perpendicular to that. If e.g. the most upstream lower actuator is activated, the rigid link between this actuator and the consecutive upper actuator will move axially. An anisotropic material such as the one described may be particularly suitable.

Figure 2D:
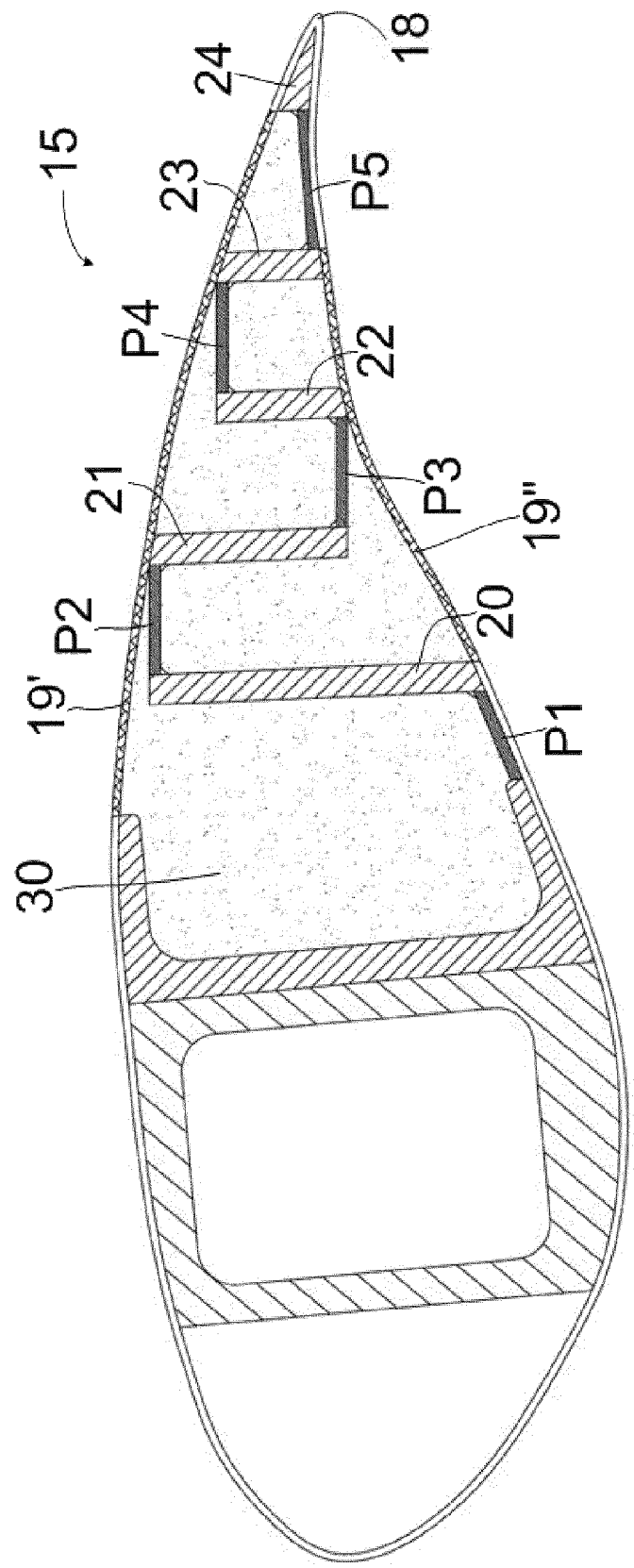

The alternative illustrated in FIG. 2d differs from that of FIG. 2a in that actuators P2-P4 although being respectively upper or lower actuators as explained in connection with FIG. 1, are not mounted tangential to the blade skin but they may be horizontally mounted in between two rigid links, i.e. P2 may be mounted in between rigid links 20 and 21, P3 in between rigid links 21 and 22 and P4 in between rigid links 22 and 23a. With this internal structure, a suction side 15 of the blade skin along almost the whole trailing edge 12 may be made of a substantially flexible material 19' (with the exception of the trailing edge end 18 and the area on which structural element 24 rests) and a pressure side 16 of the blade skin along almost the whole trailing edge 12 (with the exception of the areas on which actuators P1 and P5 and rigid link 20 rest) may also be made of a flexible material 19". Furthermore, the alternative illustrated in FIG. 2d may comprise inner areas 30 of the blade trailing edge portion 12 that may be filled with a honeycomb structure material as explained above in connection with FIG. 2a.

Contrary to previous examples, the rigid links are not supported by "normal" skin material i.e. any known composite material typically used in wind turbine blades construction. Because of the rigidity of the links, no stiff skin material is needed and thus manufacture of the blade may be simplified. Alternatively, the rigid links may be supported by normal skin material.

FIG. 3 shows a cross-sectional view of a wind turbine blade 10' according to another embodiment. The same reference numbers will be used for matching parts.

The embodiment of FIG. 3 may comprise two piezoelectric actuators P1' and P2' that may be arranged respectively below (lower actuator) and above (upper actuator) a chord line (not shown) of the blade section. In this case a substantially rigid element in the form of a rigid beam 17' may emerge from the spar box 14 towards the trailing edge end 18. In order to arrange both actuators P1' and P2' substantially downstream from one another, the lower actuator P1' may be mounted in between such a rigid beam 17' and a rigid link 20' connecting a downstream end D1 of actuator P1' with an upstream end U2 of actuator P2' and a downstream end D2 of actuator P2' may be connected to a further structural element 24' connected to the trailing edge end 18. In this case inner areas 30' of the blade trailing edge portion 12 may also be filled with a honeycomb structure material. Furthermore, the blade skin of almost the whole trailing edge portion 12 may be made of a flexible material 19''' with the exception of the trailing edge end 18 and that area on which structural element 24' rests.

As explained above, the basic principle lies on having at least two actuators arranged substantially downstream from one another and connected to each other by a substantially rigid link conforming an internal structure arranged inside a trailing edge portion of a blade section such that upon activation of any of the actuators a structural shape of the trailing edge portion changes.

Although the actuators described are piezoelectric elements, it should be understood that other type of actuators having a substantially instantaneously lineal behavior such as bistable elements or mechanical actuators such as pneumatic or hydraulic cylinders may also be foreseen. Furthermore, other combinations and/or quantity of actuators are also possible as long as there are at least two actuators, one being an upper actuator and the other being a lower actuator. This way, whenever three or more actuators are being used a substantially zig-zag shape can be defined.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A wind turbine blade,
    comprising at least one deformable trailing edge section having
        a plurality of actuators consecutively arranged substantially downstream from one another, and
        a control system for controlling the actuators,
        wherein a downstream end of one actuator is connected by a rigid link with an upstream end of a next actuator and the plurality of actuators comprises at least one upper actuator mounted above a chord line of the blade and at least one lower actuator being mounted below the chord line of the blade.

2. The wind turbine blade of claim 1, wherein the actuators are consecutively arranged as alternatingly upper and lower actuators.

3. The wind turbine blade of claim 2, wherein the actuators are linked such that upon activation of the at least one upper and/or the at least one lower actuator a structural shape of the blade trailing edge section changes in at least two degrees of freedom.

4. The wind turbine blade of claim 2, wherein the at least one upper actuator is mounted close to an inner surface of a suction side of a skin of the trailing edge section and the at least one lower actuator is mounted close to an inner surface of a pressure side of the skin.

5. The wind turbine blade of claim 2, wherein the rigid link comprises a plurality of rigid links connected to the actuators, wherein the rigid links connected to the upstream end of the actuators are mounted substantially perpendicular to a skin of the trailing edge section.

6. The wind turbine blade of claim 1, wherein the actuators are linked such that upon activation of at least one upper and/or at least one lower actuator a structural shape of the trailing edge section changes in at least two degrees of freedom.

7. The wind turbine blade of claim 6, wherein the actuators are linked such that upon activation of the at least one upper and/or the at least one lower actuator at least one of a flap angle and a chord length of the blade is changed.

8. The wind turbine blade of claim 1, wherein the at least one upper actuator is mounted close to an inner surface of a suction side of a skin of the trailing edge section and the at least one lower actuator is mounted close to an inner surface of a pressure side of the skin.

9. The wind turbine blade of claim 8, wherein the actuators are mounted substantially parallel to the skin.

10. The wind turbine blade of claim 1, wherein the rigid link comprises a plurality of rigid links connected to the actuators, wherein the rigid links connected to the upstream end of the actuators are mounted substantially perpendicular to a skin of the trailing edge section.

11. The wind turbine blade of claim 1, wherein the actuators are selected from among a group consisting of piezoelectric elements, bistable elements, pneumatic actuators and hydraulic actuators.

12. The wind turbine blade of claim 1, wherein a length of the trailing edge section extending from a trailing edge end towards a tip of the blade is equal to at least one third of a total length of the blade.

13. The wind turbine blade of claim 1, wherein a length of the trailing edge section is equal to between 30% and 40% of a chord line of the blade.

14. The wind turbine blade of claim 1, wherein at least a portion of a skin of the trailing edge section not supporting the actuators nor the rigid link is made of a relatively flexible material.

15. The wind turbine blade of claim 14, wherein substantially the whole skin is made of the relatively flexible material.

16. The wind turbine blade of claim 14, wherein at least inner areas of the trailing edge section next to the flexible material are filled with an anisotropic material.

17. The wind turbine blade of claim 16, wherein the anisotropic material is a honeycomb structure.

18. A wind turbine comprising at least one blade according to claim 1.

19. A method of controlling loads on the wind turbine blade according to claim 1, wherein the method comprises activating the at least one upper and/or the at least one lower actuator such that a structural shape of the trailing edge section changes in at least two degrees of freedom.

20. The method of claim 19, wherein the actuators are consecutively arranged as alternatingly upper and lower actuators.

* * * * *